(12) United States Patent
Radhakrishnan et al.

(10) Patent No.: US 7,979,561 B2
(45) Date of Patent: Jul. 12, 2011

(54) METHOD OF MULTIPLEXING OVER AN ERROR-PRONE WIRELESS BROADCAST CHANNEL

(75) Inventors: Dhinakar Radhakrishnan, San Diego, CA (US); Bruce Collins, San Diego, CA (US); Shusheel Gautam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1283 days.

(21) Appl. No.: 11/369,464

(22) Filed: Mar. 7, 2006

(65) Prior Publication Data

US 2006/0230172 A1    Oct. 12, 2006

Related U.S. Application Data

(60) Provisional application No. 60/660,865, filed on Mar. 10, 2005.

(51) Int. Cl.
*H04J 1/08* (2006.01)
(52) U.S. Cl. ........ 709/228; 709/236; 370/228; 370/236; 455/8
(58) Field of Classification Search .................. 709/232, 709/236, 228; 455/70, 72, 8; 370/228, 326
See application file for complete search history.

(56) References Cited

U.S. PATENT DOCUMENTS

| | | | |
|---|---|---|---|
| 6,511,280 B1 * | 1/2003 | Sammartino et al. | 414/784 |
| 6,594,252 B1 * | 7/2003 | Barany et al. | 370/347 |
| 7,095,780 B2 * | 8/2006 | Nakamura et al. | 375/146 |
| 7,352,693 B2 * | 4/2008 | Seid et al. | 370/216 |
| 7,369,527 B2 * | 5/2008 | Heo et al. | 370/335 |
| 7,466,721 B2 * | 12/2008 | Levi et al. | 370/474 |
| 7,529,274 B2 * | 5/2009 | Porter | 370/512 |
| 7,680,151 B2 * | 3/2010 | Dougall et al. | 370/473 |
| 7,706,318 B2 * | 4/2010 | Lee et al. | 370/322 |
| 2003/0200499 A1 * | 10/2003 | Khayrallah | 714/776 |

FOREIGN PATENT DOCUMENTS

| | | |
|---|---|---|
| JP | 2003324733 | 11/2003 |
| WO | 9956423 | 11/1999 |
| WO | WO 02/080590 | 10/2002 |

OTHER PUBLICATIONS

"Digital Video Broadcasting (DVB); DVB-H Implementation Guidelines; ETSI TR 102 377" ETSI Standards, European Telecommunications Standards Institute, Sophia-Antipo, FR, vol. BC, No. V111, (Feb. 2005)m XP014027140, ISSN: 0000-0001, paragraph 4.3, paragraph 5.2.3, paragraph 5.3.5, paragraph 5.3.7, paragraph 5.4.1, paragraph 5.4.3.1.

(Continued)

*Primary Examiner* — Kevin Bates
(74) *Attorney, Agent, or Firm* — Gerald P. Joyce, III

(57) ABSTRACT

Provided is a method and system for transmitting information. The method includes determining stream length information for at least one data stream to be transmitted and associating the stream length information with a system parameter message. The system parameter message including the associated stream length information is transmitted separately from the data stream. This process facilitates de-multiplexing of individual streams and the processing of stream data even if one or more individual streams are received in error.

17 Claims, 10 Drawing Sheets

OTHER PUBLICATIONS

"Digital Video Broadcasting (DVB); DVB specification for data broadcasting; Final draft ETSI En 301 192" ETSI Standards, European Telecommunications Standards Institute, Sophia-Antip, FR, vol. BC, No. V141, (Jun. 2004), XP014015280, ISSN: 0000-0001, paragraph 9.1-9. 10.

"Digital Video Broadcasting (DVB); Framing structure, channel coding and modulation for digital terrestrial television; ETSI EN 300 744" ETSI Standards, European Telecommunications Standards Institute, Sophia-Antipo, FR, vol. BC, No. V151, (Nov. 2004), xp014026912, issn: 0000-0001, Paragraph 4.4.

Henriksson J: "DVB-H Outline" WWW.DVB.ORG, (Dec. 19, 2003), XP002296398, pp. 21, 22.

"Digital Video Broadcasting (DVB); Transmission to Handheld Terminals (DVB-H); Validation Task Force Report European Broadcasting Union Union Europeene de Radio-Televsion EBU[Pts] UER; ETSI TR 102 104" (May 2005), ETSI Standards, European Telecommunications Standards Institute, Sophia-Antipo, FR, xp014030396, issn: 0000-0001 the whole document.

International Search Report—PCT/US2006/008988, International Search Authority—European Patent Office—Jul. 14, 2006.

Written Opinion—PCT/US2006/008988, International Search Authority—European Patent Office—Jul. 14, 2006.

International Preliminary Report on Patentability—PCT/US2006/008988, International Preliminary Examining Authority—European Patent Office—Jun. 1, 2007.

Digital Video Broadcasting (DVB); DVB Specification for Data Broadcasting; ETSI EN 301 192; ETSI Standards, European Telecommunications Standards Institute, Sophia-Antipo, France, vol. BC, No. V141 (Nov. 2004), pp. 1-78, XP014026918 ISSN: 0000-0001.

Digital Video Broadcasting (DVB); DVB-H Implementation Guidelines European Broadcasting/Union Union Europeenne de Radio-Television, EBU-UER; ETSI TR 102 377, V1.2.1 (Nov. 2005).

Digital Video Broadcasting (DVD); DVB-H Implementation Guidelines; ETSI TR 102 337 (Feb. 2005).

\* cited by examiner

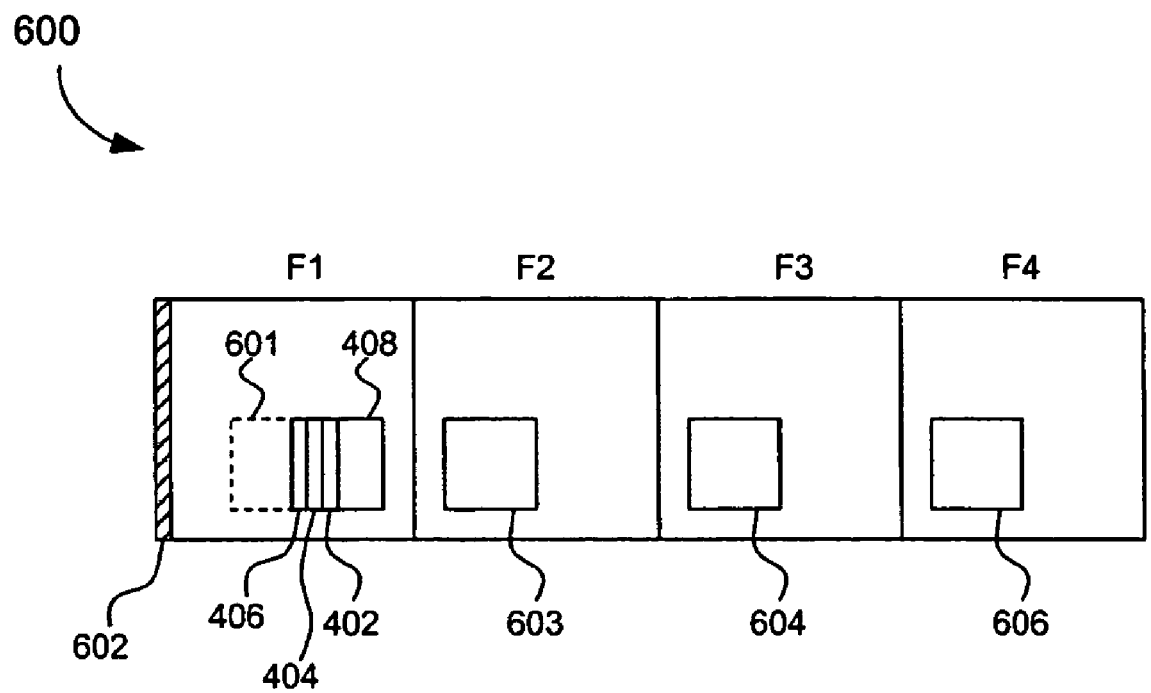
FIG. 6
(Conventional)

METHOD OF MULTIPLEXING OVER AN ERROR-PRONE WIRELESS BROADCAST CHANNEL

CLAIM OF PRIORITY UNDER 35 U.S.C. §119

The present Application for Patent claims priority to Provisional Application No. 60/660,865, filed Mar. 10, 2005, and assigned to the assignee hereof and hereby expressly incorporated by reference herein.

BACKGROUND

1. Field of the Invention

The present invention relates to transmission efficiency in a communications network. More specifically, the present invention relates to reducing transmission errors in a wireless communications network.

2. Background Art

FLO is a technology designed primarily for the efficient and economical distribution of the same multimedia content to millions of wireless subscribers simultaneously. The goal of FLO technology is to reduce costs associated with delivering such content and allow users to surf channels of content on the mobile handsets typically used for traditional cellular voice and data services. This multimedia content is also known as services. A service is an aggregation of one or more independent data components. Each independent data component of a service is called a flow.

Services are classified into two types based on their coverage: Wide-area services and Local-area services. A Local-area service is multicast for reception within a metropolitan area. By contrast, Wide-area services are multicast in one or more metropolitan areas.

FLO services are carried over one or more logical channels, known as MediaFLO™ Logical Channels or MLCs. An MLC may be divided into a maximum of three logical sub-channels. These logical sub-channels are called streams. Each flow is carried in a single stream.

Processing of MLCs in a FLO network is controlled based upon control Protocol information. The control protocol information is transmitted over the air by the network in units call physical layer packets (PLPs).

Within a FLO network, multiplexing multiple streams of different media onto an error-prone, wireless broadcast channel can present significant challenges. In particular, if the overhead information necessary for a network device to de-multiplex and/or decode the data is received by a receiver at the device in error, the corresponding media is lost until valid overhead information is received. If the PLPs carrying the stream information are received in error, the receiver will be unable to de-multiplex and/or decode individual streams, even though the media has been received error free.

What is needed, therefore, is a method and system to de-multiplex individual streams and process stream data even if one or more individual streams are received in error.

BRIEF SUMMARY

Consistent with the principles of the present invention as embodied and broadly described herein, the present invention includes a method for transmitting information. The method includes determining stream length information for at least one data stream to be transmitted and associating the stream length information with a system parameter message. The system parameter message including the associated stream length information is transmitted separately from the data stream.

In an aspect, an apparatus for transmitting information includes means for determining stream length information for at least one data stream to be transmitted and means for associating the stream length information with a system parameter message. The apparatus also includes means for transmitting the system parameter message including the associated stream length information separately from the data stream.

In another aspect, a computer readable medium carrying one or more sequences of one or more instructions for execution by one or more processors performs a method for transmitting information. The instructions when executed by the one or more processors, cause the one or more processors to perform the steps of determining stream length information for at least one data stream to be transmitted and associating the stream length information with a system parameter message. Also performed is the step of transmitting the system parameter message including the associated stream length information separately from the data stream.

In another aspect, a transmission module for transmitting information includes a determination portion configured to determine stream length information for at least one data stream to be transmitted. The transmission module also includes an associating portion configured to associate the stream length information with a system parameter message. A transmitter is configured to transmit the system parameter message including the associated stream length information separately from the data stream.

In yet another aspect, a system includes a processor having first and second logic portions. The first logic portion determines stream length information for at least one data stream to be transmitted and the second logic portion associates the stream length information with a system parameter message. A transmitter is configured to transmit the system parameter message including the associated stream length information separately from the data stream.

Multiplexing multiple streams of different media onto an error-prone, wireless broadcast channel presents special challenges. In particular, if the overhead information necessary for the device to de-multiplex and/or decode the data is received by a receiver at the device in error, the corresponding media will be lost until valid overhead information is received.

The present invention solves this problem by putting the length of each stream being carried in a MLC, needed to de-multiplex individual streams, in an overhead information symbols (OIS) channel. The Stream length information can be carried in-band along with the stream layer packets. In conventional systems, if the PLPs carrying the stream length information are received in error, there is no way for the receiver to de-multiplex individual stream data, even though the data is received without any errors. In the present invention, however, even though the individual streams may carry PLPs that are received in error, it is still possible to de-multiplex individual streams to process the stream data.

Multiple streams of media are transmitted within an MLC in a super frame. The disclosed embodiments of the present invention provide for sending the information about the streams, e.g., length of each stream being carried in an MLC, independently from the streams so that the receiver can de-multiplex individual streams. The information about the stream can be carried separately from the stream layer packets.

Further features and advantages of the present invention as well as the structure and operation of various embodiments of the present invention, are described in detail below with reference to the accompanying drawings.

BRIEF DESCRIPTION OF THE DRAWINGS

The accompanying drawings, which are incorporated herein and constitute part of the specification, illustrate embodiments of the present invention and, together with the general description given above and the detailed description of the embodiments given below, serve to explain the principles of the invention. In the drawings:

FIG. 6 is an illustration of an exemplary super-frame used within a conventional network;

DETAILED DESCRIPTION

Figure 1:
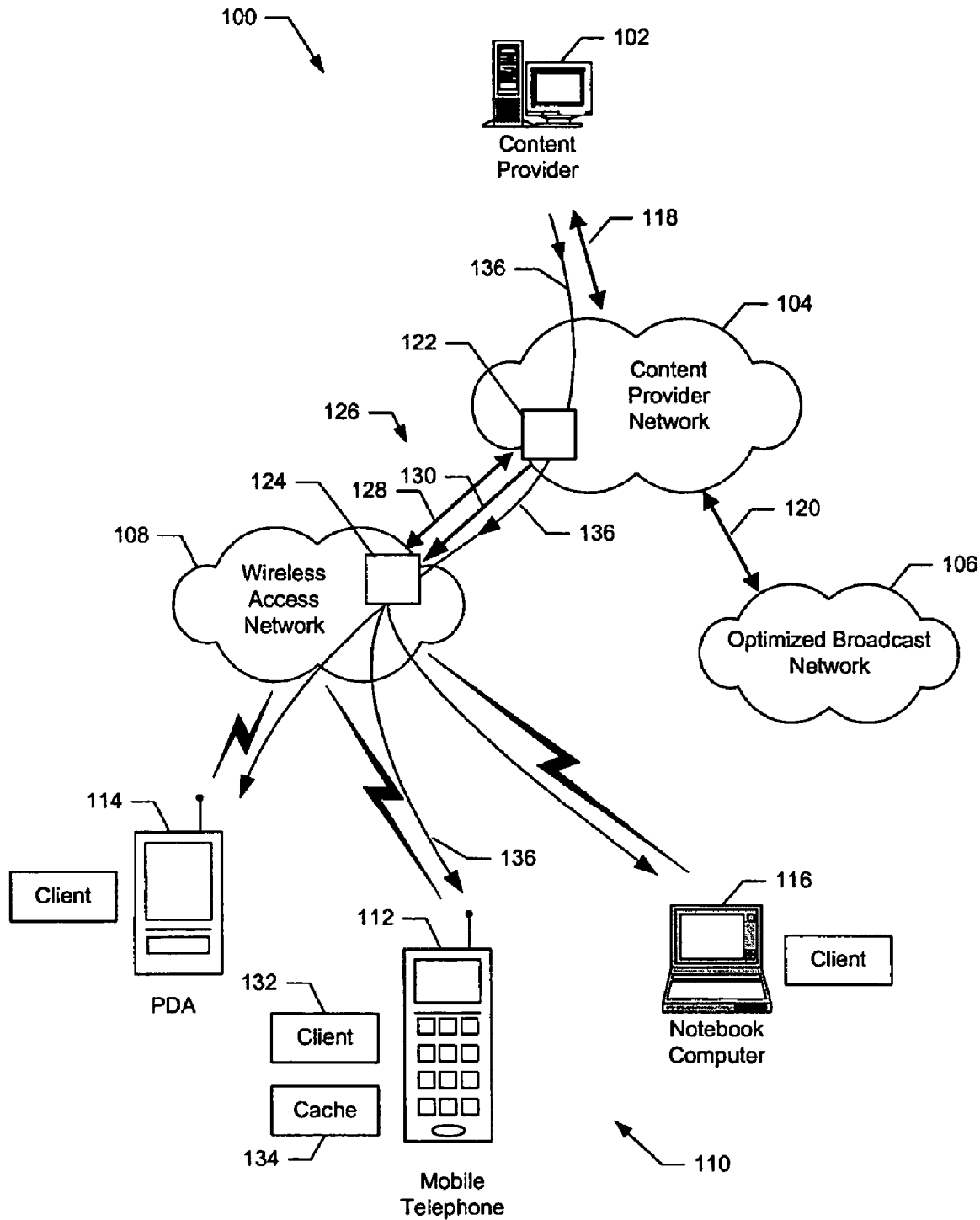
FIG. 1 is an illustration of a network including one embodiment of a content delivery system.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

FIG. 1 shows a communication network 100 that comprises a transport system 136 that operates to create and transport multimedia content flows across data networks. For example, the transport system is consistent with the principles of the FLO system, noted above, and is suitable for use in transporting content clips from a content provider network to a wireless access network for broadcast distribution.

The network 100 comprises a content provider (CP) 102, a content provider network 104, an optimized broadcast network 106, and a wireless access network 108. The network 100 also includes devices 110 that comprise a mobile telephone 112, a personal digital assistance (PDA) 114, and a notebook computer 116. The devices 110 illustrate just some of the devices that are suitable for use with the transport system 136. It should be noted that although three devices are shown in FIG. 1, virtually any number of analogous devices, or types of devices are suitable for use in the transport system 136, as would be apparent to those skilled in the relevant art.

The content provider 102 operates to provide content for distribution to users in the network 100. The content comprises video, audio, multimedia content, clips, real-time and non real-time content, scripts, programs, data or any other type of suitable content. The content provider 102 provides the content to the content provider network 104 for distribution. For example the content provider 102 communicates with the content provider network 104 via the communication link 118, which comprises any suitable type of wired and/or wireless communication link.

The content provider network 104 comprises any combination of wired and wireless networks that operate to distribute content for delivery to users. The content provider network 104 communicates with the optimized broadcast network 106 via the link 120. The link 120 comprises any suitable type of wired and/or wireless communication link. The optimized broadcast network 106 comprises any combination of wired and wireless networks that are designed to broadcast high quality content. For example, the optimized broadcast network 106 may be a specialized proprietary network that has been optimized to deliver high quality content to selected devices over a plurality of optimized communication channels.

The transport system 136 operates to deliver content from the content provider 102 for distribution to a content server (CS) 122 at the content provider network 104 that operates to communicate with a broadcast base station (BBS) 124 at the wireless access network. The CS 122 and the BBS 124 communicate using one or more embodiments of a transport interface 126 that allows the content provider network 104 to deliver content in the form of content flows to the wireless access network 108 for broadcast/multicast to the devices 110. The transport interface 126 comprises a control interface 128 and a bearer channel 130. The control interface 128 operates to allow the CS 122 to add, change, cancel, or otherwise modify contents flows that flow from the content provider network 104 to the wireless access network 108. The bearer channel 130 operates to transport the content flows from the content provider network 104 to the wireless access network 108.

The CS 122 uses the transport interface 126 to schedule a content flow to be transmitted to the BBS 124 for broadcast/multicast over the wireless access network 108. For example, the content flow may comprise a non real-time content clip that was provided by the content provider 102 for distribution using the content provider network 104. The CS 122 operates to negotiate with the BBS 124 to determine one or more parameters associated with the content clip. Once the BBS 124 receives the content clip, it broadcasts/multicasts the content clip over the wireless access network 108 for reception by one or more of the devices 110. Any of the devices 110 may be authorized to receive the content clip and cache it for later viewing by the device user.

In the foregoing example, the device 110 comprises a client program 132 that operates to provide a program guide that displays a listing of content that is scheduled for broadcast over the wireless access network 108. The device user may then select to receive any particular content for rendering in real-time or to be stored in a cache 134 for later viewing. For example the content clip may be scheduled for broadcast during the evening hours, and the device 112 operates to receive the broadcast and cache the content clip in the cache 134 so that the device user may view the clip the next day. Typically, the content is broadcast as part of a subscription service and the receiving device may need to provide a key or otherwise authenticate itself to receive the broadcast.

The transport system 136 allows the CS 122 to receive program-guide records, program contents, and other related information from content provider 102. The CS 122 updates and/or creates content for delivery to devices 110.

Figure 2:
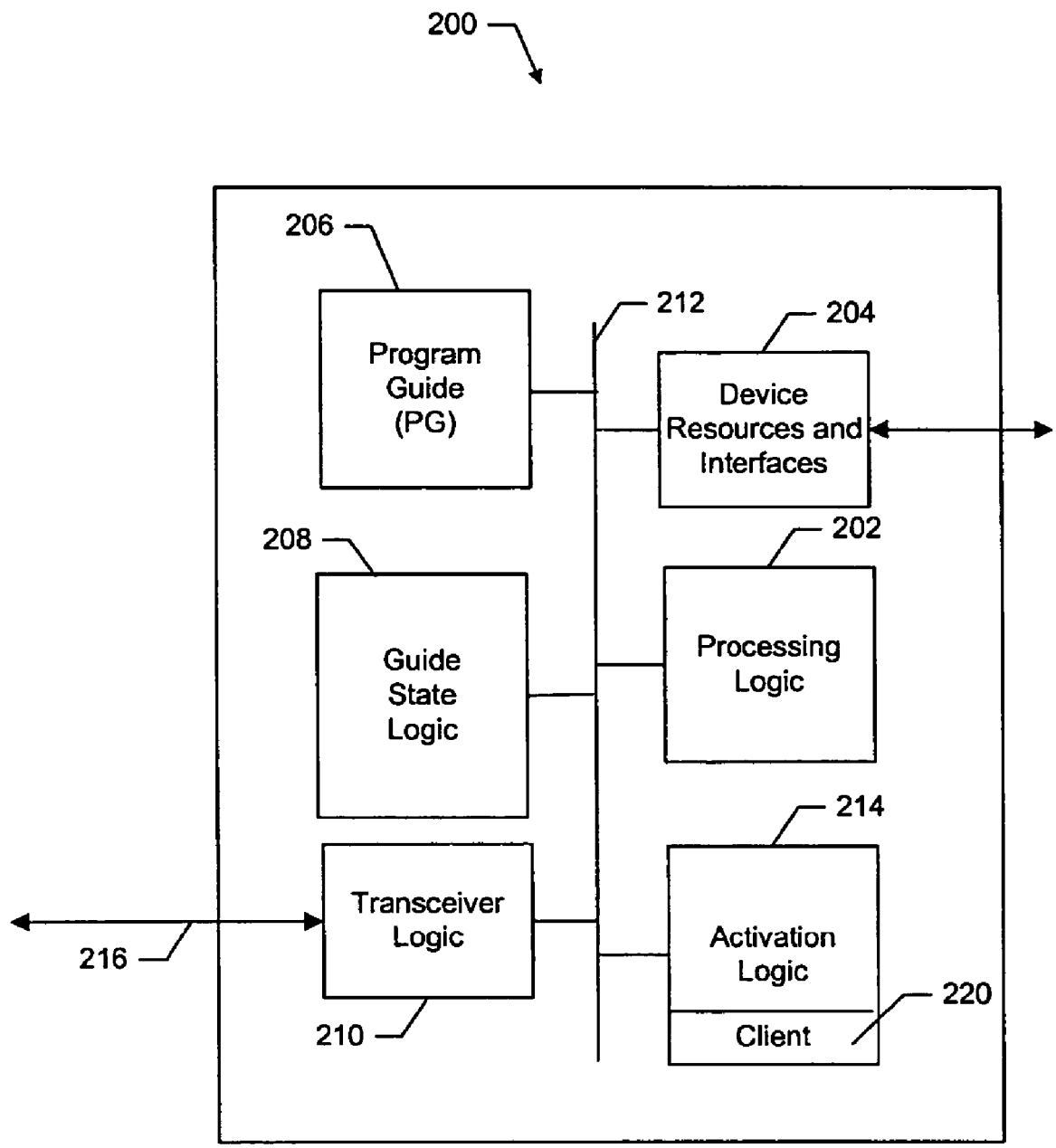
FIG. 2 is an illustration of a content provider suitable for use in the embodiment of the content delivery system of FIG. 1.

FIG. 2 shows a content provider server 200 suitable for use in the content delivery system. For example, the server 200 may be used as the server 102 in FIG. 1. The server 200 comprises processing logic 202, resources and interfaces 204, and transceiver logic 210, all coupled to an internal data bus 212. The server 200 also comprises activation logic 214, PG 206, and Guide State logic 208, which are also coupled to the data bus 212.

The processing logic 202 comprises a central processing unit (CPU), processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 212.

The resources and interfaces 204 comprise hardware and/or software that allow the server 200 to communicate with internal and external systems. For example, the internal systems may include mass storage systems, memory, display driver, modem, or other internal device resources. The external systems may include user interface devices, printers, disk drives, or other local devices or systems.

The transceiver logic 210 comprises hardware logic and/or software that operates to allow the server 200 to transmit and receive data and/or other information with remote devices or systems using communication channel 216. For example, the communication channel 216 comprises any suitable type of communication link to allow the server 200 to communicate with a data network.

The activation logic 214 comprises a CPU, processor, gate array, hardware logic, memory elements, virtual machine, software, and/or any combination of hardware and software. The activation logic 214 operates to activate a CS and/or a device to allow the CS and/or the device to select and receive content and/or services described in the PG 206. The activation logic 214 transmits a client program 220 to the CS and/or the device during the activation process. The client program 220 runs on the CS and/or the device to receive the PG 206 and display information about available content or services to the device user. Thus, the activation logic 214 operates to authenticate a CS and/or a device, download the client 220, and download the PG 206 for rendering on the device by the client 220.

The PG 206 comprises information in any suitable format that describes content and/or services that are available for devices to receive. For example, the PG 206 may be stored in a local memory of the server 200 and may comprise information such as content or service identifiers, scheduling information, pricing, and/or any other type of relevant information. The PG 206 comprises one or more identifiable sections that are updated by the processing logic 202 as changes are made to the available content or services.

The Guide State 208 comprises hardware and/or software that operates to generate notification messages that identify and/or describe changes to the PG 206. For example, when the processing logic 202 updates the PG 206, the Guide State logic 208 is notified about the changes. The Guide State logic 208 then generates one or more notification messages that are transmitted to CSs, which may have been activated with the server 200, so that these CSs are promptly notified about the changes to the PG 206.

As part of the content delivery notification message, a broadcast indicator is provided that indicates when a section of the PG identified in the message will be broadcast. For example, the broadcast indicator may comprise one bit to indicate that the section will be broadcast and a time indicator that indicates when the broadcast will occur. Thus, the CSs and/or the devices wishing to update their local copy of the PG records can listen for the broadcast at the designated time to receive the updated section of the PG records.

In one embodiment, the content delivery notification system comprises program instructions stored on a computer-readable media, which when executed by a processor, for instance, the processing logic 202, provides the functions of the server 200 described herein. For example, the program instructions may be loaded into the server 200 from a computer-readable media, such as a floppy disk, CDROM, memory card, FLASH memory device, RAM, ROM, or any other type of memory device or computer-readable media that interfaces to the server 200 through the resources 204. In another embodiment, the instructions may be downloaded into the server 200 from an external device or network resource that interfaces to the server 200 through the transceiver logic 210. The program instructions, when executed by the processing logic 202, provide a guide state notification system as described herein.

Figure 3:
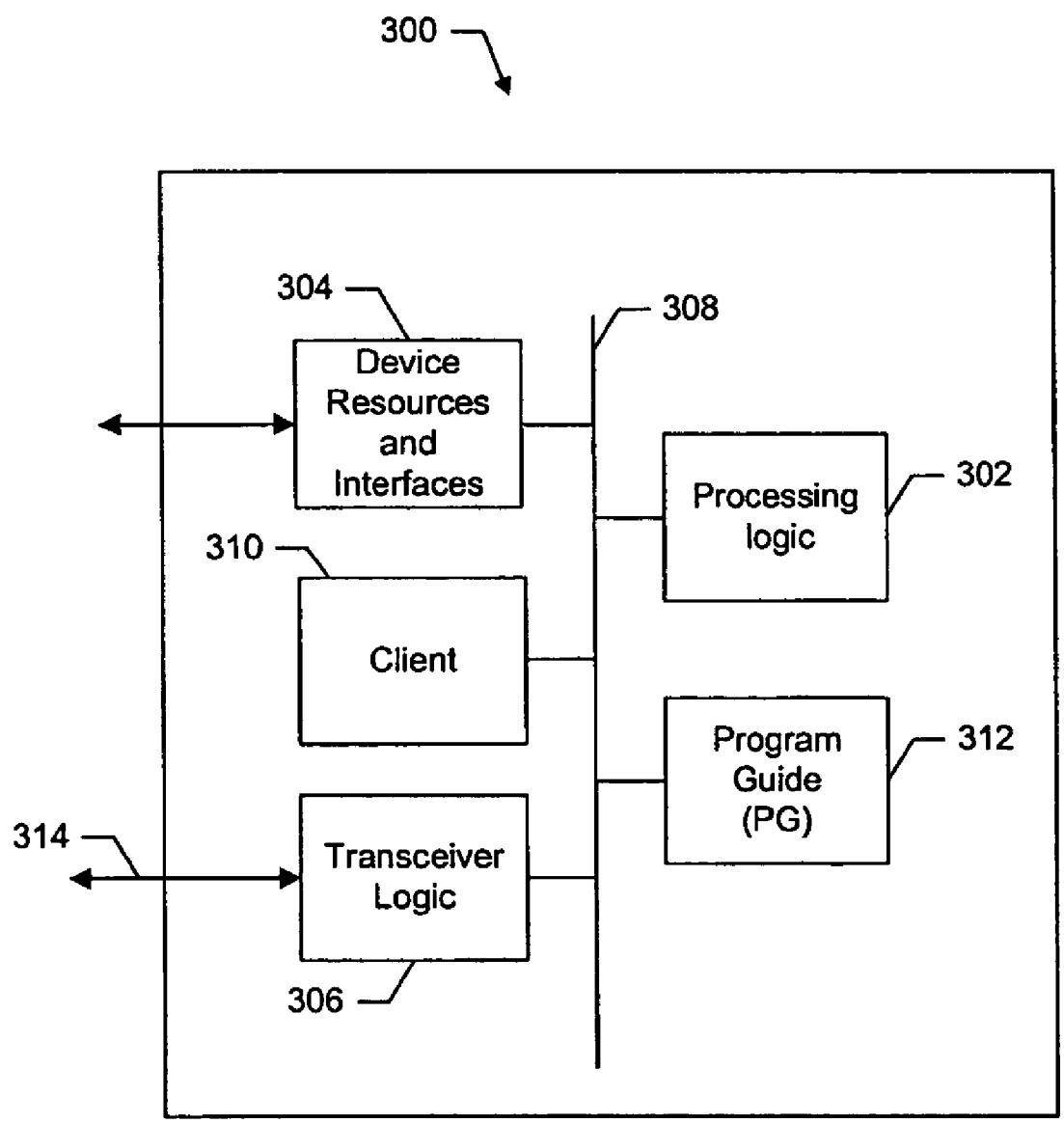
FIG. 3 is an illustration of a content server suitable for use in the embodiment of the content delivery system of FIG. 1.

FIG. 3 shows a content server (CS) or device 300 suitable for use in a content delivery system. For example, CS 300 may be the CS 122 shown in FIG. 1. The CS 300 comprises processing logic 302, resources and interfaces 304, and transceiver logic 306, all coupled to a data bus 308. The CS 300 also comprises a client 310, and a Program Guide (PG) logic 312, which are also coupled to the data bus 308.

The processing logic 302 comprises a CPU, processor, gate array, hardware logic, memory elements, virtual machine, software, and/or any combination of hardware and software. Thus, the processing logic 302 generally comprises logic configured to execute machine-readable instructions and to control one or more other functional elements of the CS 300 via the internal data bus 308.

The resources and interfaces 304 comprise hardware and/or software that allow the CS 300 to communicate with internal and external systems. For example, internal systems may include mass storage systems, memory, display driver, modem, or other internal device resources. The external systems may include user interface devices, printers, disk drives, or other local devices or systems.

The transceiver logic 306 comprises hardware and/or software that operate to allow the CS 300 to transmit and receive data and/or other information with external devices or systems through communication channel 314. For example, the communication channel 314 may comprise a network communication link, a wireless communication link, or any other type of communication link.

During operation, the CS 300 is activated so that it may receive available content or services over a data network. For example, the CS 300 identifies itself to a content provider server during an activation process. As part of the activation process, the CS 300 receives and stores PG records by PG logic 312. The PG 312 contains information that identifies content or services available for the CS 300 to receive. The client 310 operates to render information in the PG logic 312 on the CS and/or the device 300 using the resources and interfaces 304. For example, the client 310 renders information in the PG logic 312 on a display screen that is part of the device. The client 310 also receives user input through the resources and interfaces so that a device user may select content or services.

The CS 300 receives notification messages through the transceiver logic 306. For example, the messages may be broadcast or unicast to the CS 300 and received by the transceiver logic 306. The PG notification messages identify updates to the PG records at the PG logic 312. In one embodiment, the client 310 processes the PG notification messages to determine whether the local copy at the PG logic 312 needs to be updated. For example, in one embodiment, the notification messages include a section identifier, start time, end time, and version number.

The CS 300 operates to compare the information in the PG notification messages to locally stored information at the existing PG logic 312. If the CS 300 determines from the PG notification messages that one or more sections of the local copy at the PG logic 312 needs to be updated, the CS 300 operates to receive the updated sections of the PG in one of several ways. For example, the updated sections of the PG may be broadcast at a time indicated in the PG notification messages, so that the transceiver logic 306 may receive the broadcasts and pass the updated sections to the CS 300, which in turn updates the local copy at the PG logic 312.

The CS 300 determines which sections of the PG need to be updated based on the received PG update notification messages, and transmits a request to a CP server to obtain the desired updated sections of the PG. For example, the request may be formatted using any suitable format and comprise information such as a requesting CS identifier, section identifier, version number, and/or any other suitable information.

The CS 300 performs one or more of the following functions in one or more embodiments of a PG notification system. It should be noted that the following functions might be changed, rearranged, modified, added to, deleted, or otherwise adjusted within the scope of the invention.

1. The CS is activated for operation with a content provider system to receive content or services. As part of the activation process, a client and PG are transmitted to the CS.

2. One or more PG notification messages are received by the CS and used to determine if one or more sections of the locally stored PG need to be updated.

3. In one embodiment, if the CS determines that one or more sections of the locally stored PG need to be updated, the CS listens to a broadcast from the distribution system to obtain the updated sections of the PG that it needs to update its local copy.

4. In another embodiment, the CS transmits one or more request messages to the CP to obtain the updated sections of the PG it needs.

5. In response to the request, the CP transmits the updated sections of the PG to the CS.

6. The CS uses the received updated sections of the PG to update its local copy of the PG.

The content delivery system comprises program instructions which may be stored on a computer-readable media, which when executed by a processor, such as the processing logic 302, provides the functions of the content delivery notification system as described herein. For example, instructions may be loaded into the CS 300 from a computer-readable media, such as a floppy disk, CDROM, memory card, FLASH memory device, RAM, ROM, or any other type of memory device or computer-readable media that interfaces to the CS 300 through the resources and interfaces 304. In another embodiment, the instructions may be downloaded into the CS 300 from a network resource that interfaces to the CS 300 through the transceiver logic 306. The instructions, when executed by the processing logic 302, provide a content delivery system as described herein.

It should be noted that the CS 300 represents just one implementation and that other implementations are possible within the scope of the invention.

Figure 4:
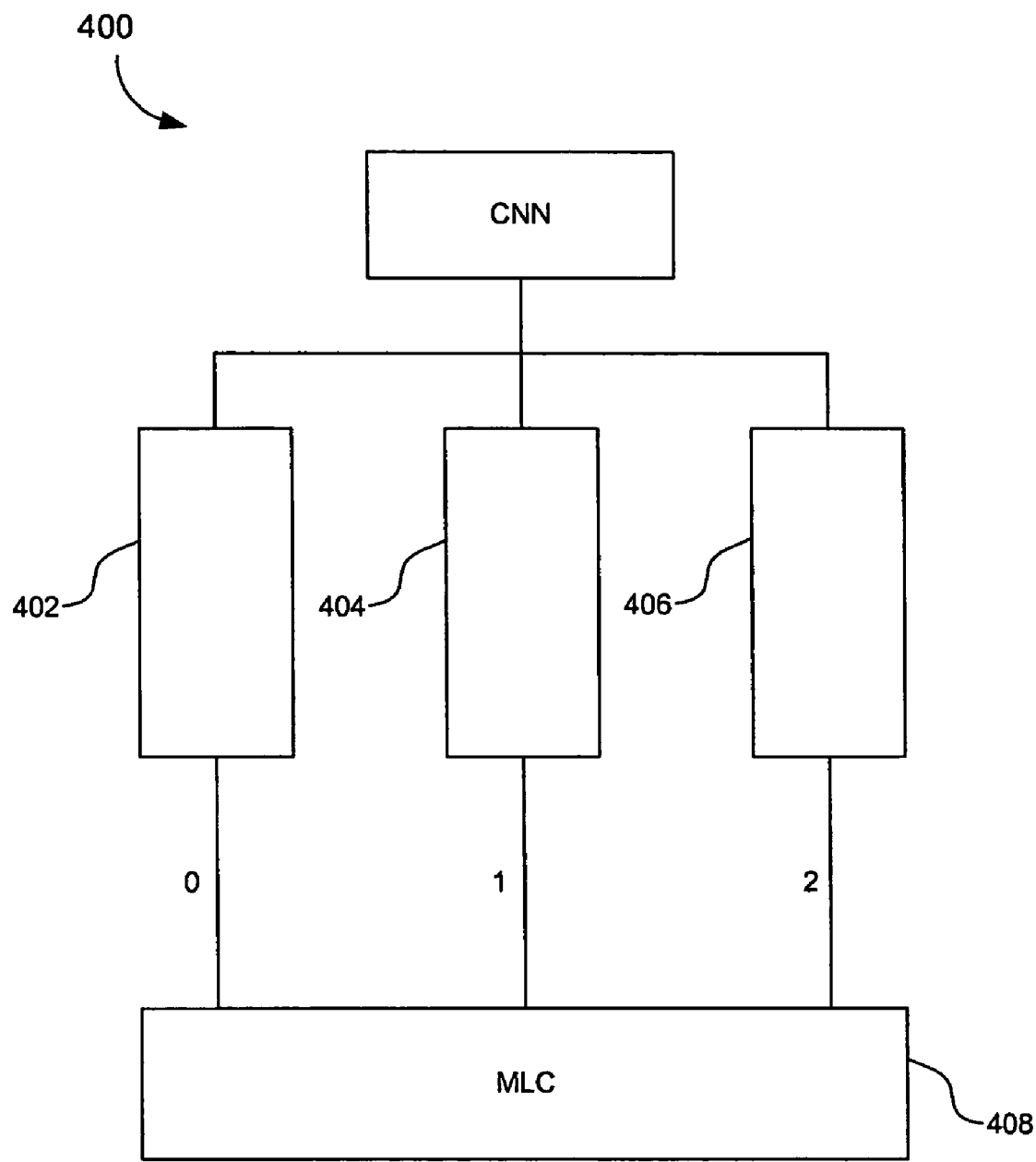
FIG. 4 is a block diagram illustration of a relationship between flows, streams, and MLCs in conventional FLO based communication networks.

FIG. 4 is a block diagram illustration of the relationship between flows, streams, and MLCs in conventional FLO based networks. By way of background, an exemplary flow 400 can include information downloaded to a device, such as the device 112, from a video mobile service provided, for example, by the cable news network (CNN). This CNN broadcast can include application level data in the form of a video flow 402, an audio flow 404, and a text flow 406. Each of the flows 402, 404, and 406, carrying unique data, will be transmitted in the physical layer of the network 100 via respective streams 0, 1, and 2 within a uniquely identifiable MLC 408.

Figure 5:
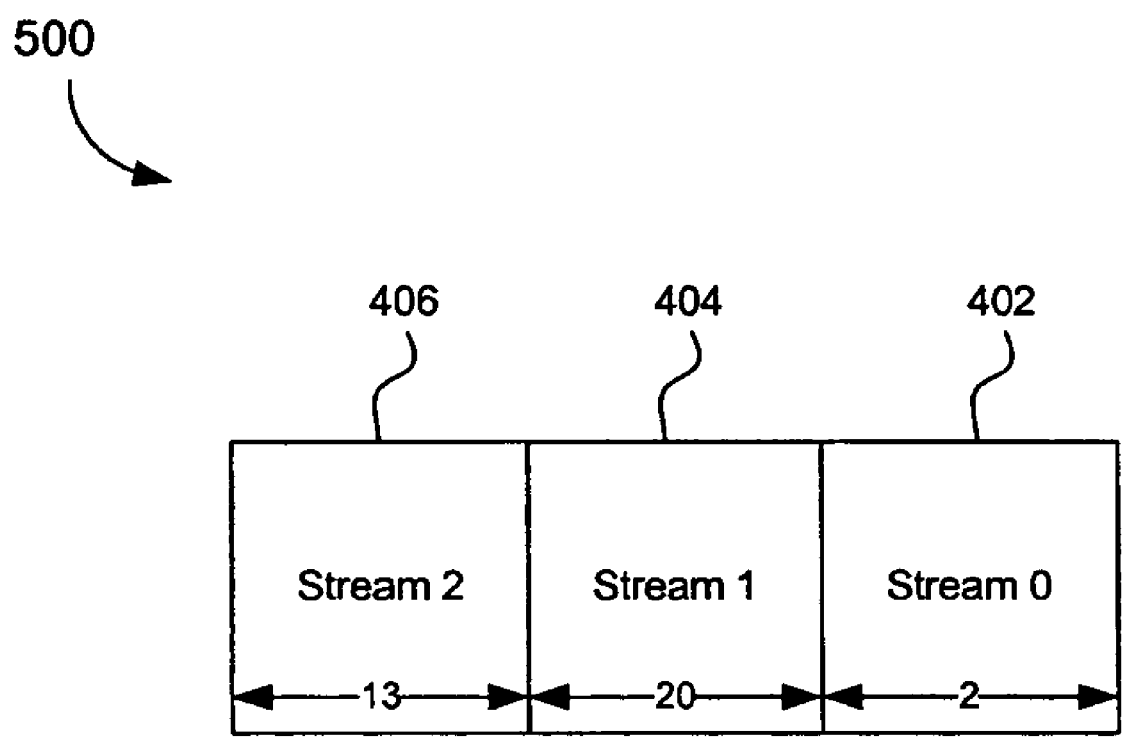
FIG. 5 is a block diagram illustration of a technique for packing streams within an MLC.

FIG. 5 is a block diagram illustration of a technique 500 for packing the streams 0-2 within the MLC 408. That is, within the context of FIG. 4 above, data from the application level flows 402, 404, and 406 is packed within the MLC 408 by first filling stream 2. Next, stream 1 is filled, and following that, stream 0 is filled. The underlying point is that the MLC 408 includes data from each of the streams 0-2. Each of the streams within all of the MLCs, within a super-frame, are filled in this manner.

FIG. 6 is an illustration of an exemplary super-frame 600, used within a conventional network, that might include the MLC 408 above with level flows 402, 404, and 406. In FIG. 6, the super-frame 600 is further sub-divided into four separate frames F1-F4. Each of the frames F1-F4 includes one or more MLCs, such as the MLC 408. with each MLC being located at the same position within a respective one of the frames F1-F4. For example, in the super-frame 600, the MLC 408 is located in the frame F1. Thus, the streams 0-2 are positioned in consecutive fashion within the frame F1.

The MLC 408 also includes an overhead portion 601 that conveys information regarding characteristics of the streams within individual MLCs associated with the super-frame 600. The super-frame 600 also includes an overhead information symbols (OIS) channel 602. The OIS channel 602, among other things, informs the device of the location of MLCs within the super-frame 600. Thus, when the device initially requests network service, it must first decode the OIS channel 602 to know the precise location, and other characteristics, of the MLC 408 before data within the MLC 408 can be unpacked and used.

The remaining frames F2-F4, of the super-frame 600, include MLCs 603, 604, and 606, respectively. Each of the MLCs 603, 604, and 606 can also include consecutively packed data represented by multiple streams.

The implication of the structure 500 of FIG. 5 and the super-frame 600 of FIG. 6 is that on the device side, in order to properly de-multiplex data from each of the streams 0-2, the device needs to know where boundaries are located between the streams. That is, the device needs to know where one stream ends and where other streams begin.

Stream lengths and boundaries are conveyed in terms of medium access control (MAC) layer packets. As understood by those of skill in the art, within a communications network, the MAC layer performs multiplexing of packets belonging to different media streams associated with MLCs. The MAC layer defines the procedures used to receive and transmit over the Physical layer of the network. The Physical layer of the network provides channel structure, frequency, power output, modulation and encoding specification for the network's forward link.

A MAC layer packet is substantially the same length as a PLP. As noted above, the control protocol information is transmitted over the air by the network in the PLPs. Thus, each MAC layer packet is transmitted over the air in one PLP.

Figure 7:
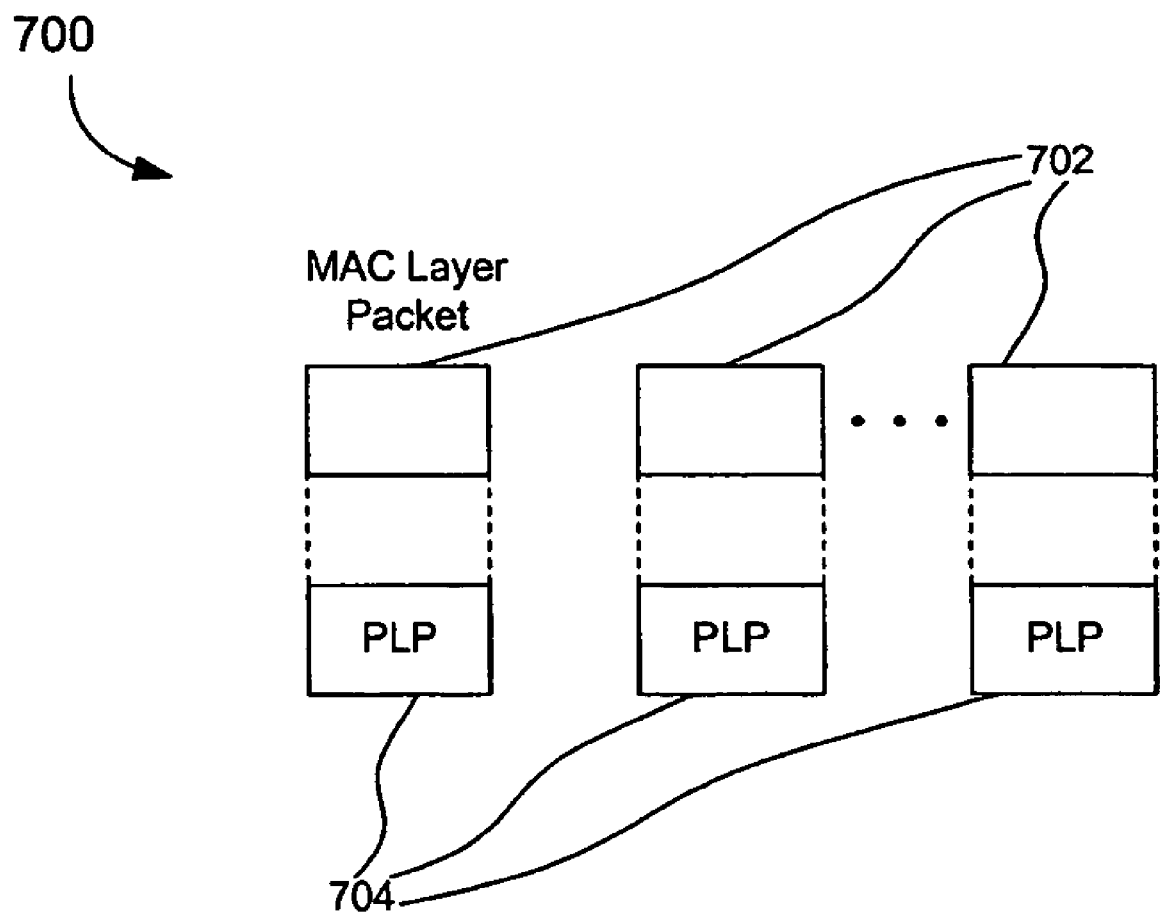
FIG. 7 is an illustration of correspondence between MAC layer packets and PLPs.

FIG. 7 is an illustration 700 of a correspondence between MAC layer packets 702 and PLPs 704. Each of the MAC layer packets 702, corresponds in length to a respective one of the PLPs 704.

Referring back to FIG. 5, the length of each of the streams 0-2 can be defined in term of MAC layer packets. For example, stream 2 might be 13 MAC layer packets, stream 1 may be 20 MAC layers packets, and stream 0 might be 2 MAC layer packets. In an MLC, MAC layer packets are shipped together within the streams. Thus, to properly de-multiplex the MLC 408, for example, the device should know the number of MAC layer packets in each of the streams 0-2. In the conventional super-frame 600, this MAC layer packet information is located in the overhead portion 601 of the MLC 408.

The challenge with structure of the conventional super-frame 600 is that if the MLC 408, especially the overhead portion 601, is corrupted, the device will not be able to de-multiplex any of the streams within the MLCs 408, 603, 604, and 606. Even if actual data within the MLCs is not corrupted, without the information located in the overhead portion 601, none of the associated streams can be processed. The present invention provides a solution to this dilemma.

In the present invention, the MAC layer packet information is also located in the OIS channel of the super-frame, in addition to the overhead portion of the related MLC. The advantage of this is that OIS channel of the super-frame is transmitted over the air using more robust transmission characteristics than those assigned for MLC transmission. Thus, the likelihood of the OIS channel being corrupted, during transmission, is less than the likelihood of the overhead portion of an MLC being corrupted.

Figure 8:
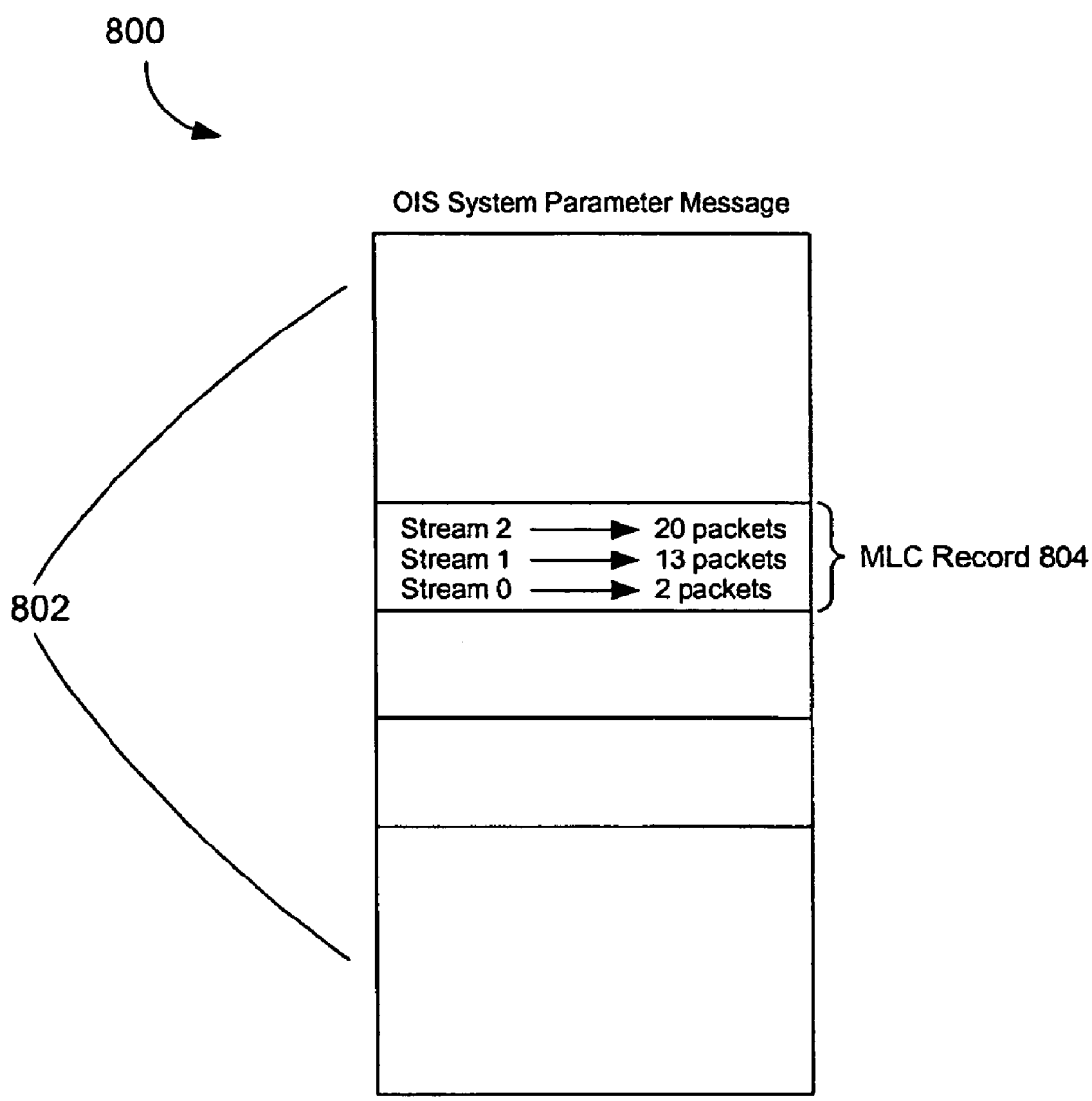
FIG. 8 is an illustration of an exemplary OIS system parameter message constructed in accordance with the embodiment.

FIG. 8 is an illustration of an exemplary OIS system parameter message 800 carried within an OIS channel in accordance with the present invention. The OIS system parameter message 800 includes records 802 concerning characteristics of MLCs in an associated super-frame. In the present invention, however, the records 802 are modified to include a segment 804 which includes the MAC layer packet and stream length information, discussed above.

In accordance with the exemplary OIS system parameter message 800 of FIG. 8, in order for a device to receive MLC data, it can be configured to read the OIS system parameter message 800 and look for the segment 804. By providing the MAC layer packet and stream length data in the more robust OIS channel, as well as within the MLCs, if individual streams are corrupted, the remaining streams can still be de-multiplexed at the device.

Figure 9:
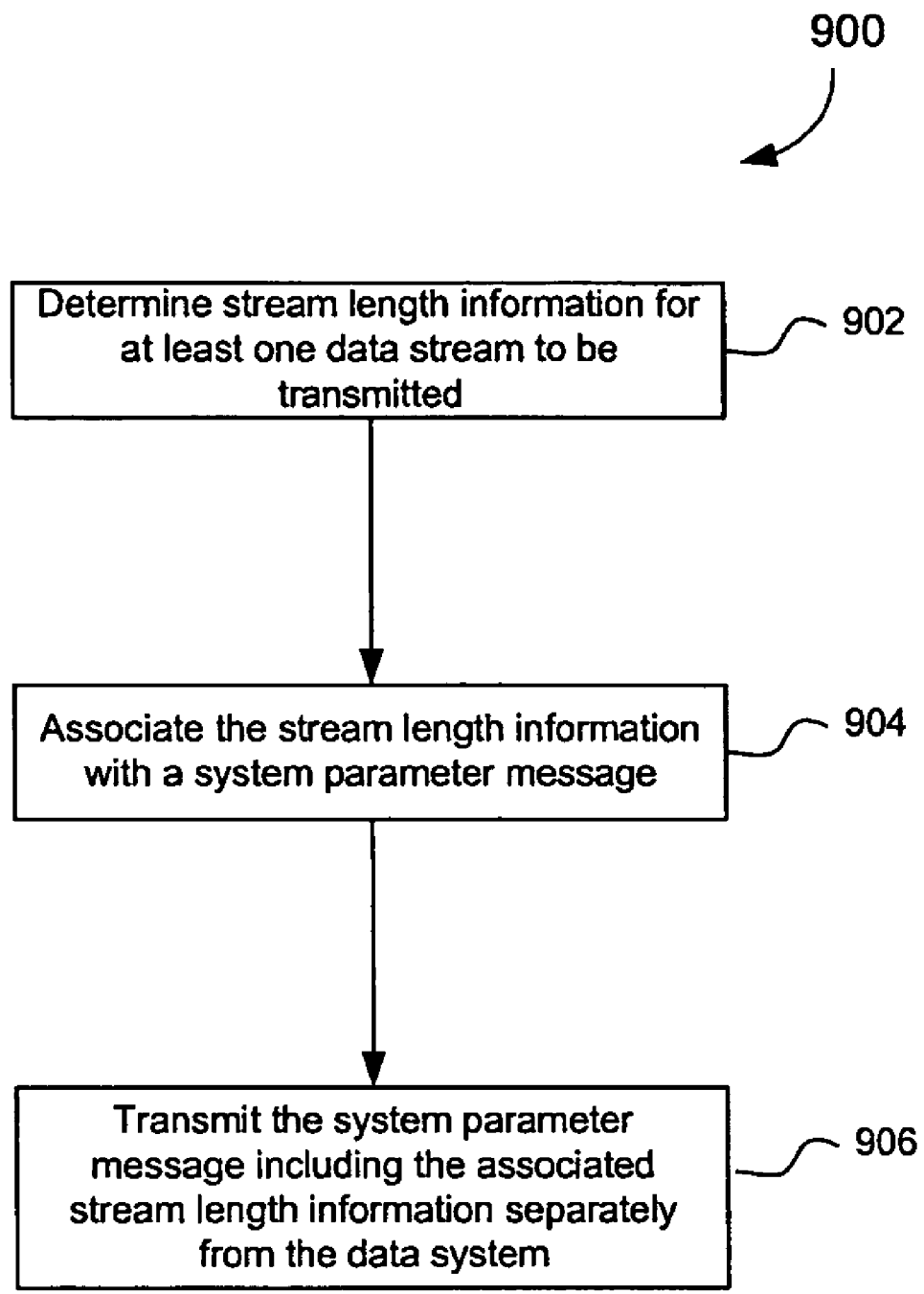
FIG. 9 is a flow diagram of an exemplary method of practicing the embodiment.

FIG. 9 is a flow diagram of an exemplary method 900 of practicing the present invention. In FIG. 9, a method for transmitting information includes determining stream length information for at least one data stream to be transmitted, as indicated in step 902 and associating the stream length information with a system parameter message, as indicated in step 904. The system parameter message, including the associated stream length information, is transmitted separately from the data stream, as shown in step 906.

Figure 10:
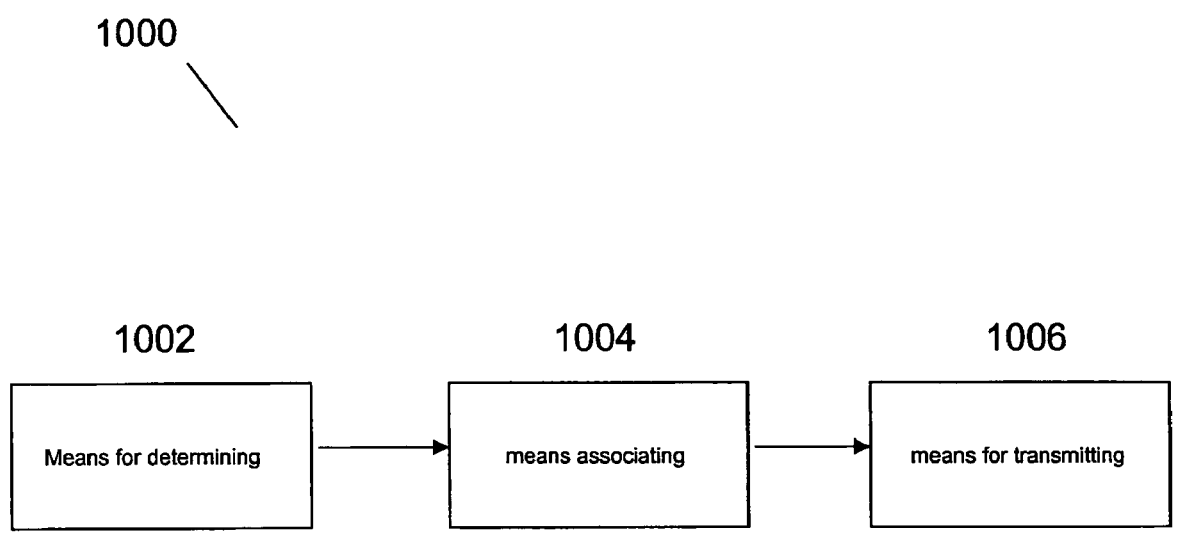
FIG. 10 is a block diagram of an exemplary system in accordance with the embodiment.

FIG. 10 is a block diagram of an exemplary system 1000 in accordance with the embodiment. In FIG. 10, means for determining 1002 determine stream length information for at least one data stream to be transmitted. Means for associating 1004 associate the stream length information with a system parameter message. Means for transmitting 1006 the system parameter message including the associated stream length information separately from the data stream.

By way of review, within the present invention, multiple streams of media are transmitted within an MLC in a super frame. The present invention provides for sending the information about the streams, e.g., length of each stream being carried in an MLC, independently from the streams so that the receiver can de-multiplex individual streams. The information about the stream can be carried separately from the stream layer packets. In this way, even though the individual streams may carry PLPs that may be received in error, it is still possible to de-multiplex individual streams to process the stream data.

In one embodiment, system parameters message (OIS) and/or Data Channel MAC protocol header (embedded-OIS) are used to carry the stream lengths for streams contained in the MLCs. Since OIS messages are transmitted in a much higher robust way, more reliable de-multiplexing and/or decoding of streams are achievable.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The Detailed Description section should primarily be used to interpret the claims. The Summary and Abstract sections may set forth one or more, but not all exemplary embodiments of the present invention as contemplated by the inventor(s), and thus, are not intended to limit the claims.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A broadcast method for transmitting information over a wireless broadcast network, comprising:
    generating a plurality of flows, each flow carrying unique data;
    generating a plurality of streams, each stream including at least a portion of the unique data carried by at least one of the plurality of flows;
    determining stream length information for each stream to be transmitted;
    associating a logical channel with the plurality of streams, the logical channel including an overhead portion, the overhead portion containing a first set of system parameter messages (SPMs), the first set of SPMs including the stream length information of each stream;
    generating a frame, the frame including
        the logical channel,
        the plurality of streams, and
        a plurality of overhead information symbols (OIS), the OIS containing information identifying the location of the logical channel within the frame and a second set of SPMs identifying the stream lengths of each stream; and
    transmitting the frame such that the first set of SPMs are transmitted on a first transmission channel and the second set of SPMs are transmitted on a second transmission channel,
    wherein the second transmission channel has more robust transmission characteristics than the first transmission channel.

2. The method of claim 1, further comprising associating the stream length information with overhead channel data.

3. The method of claim 1, wherein the stream length information is based upon medium access control (MAC) layer packets.

4. The method of claim 1, wherein the second set of SPMs are transmitted in accordance with first transmission characteristics and each stream is transmitted in accordance with second transmission characteristics.

5. The method of claim 1, wherein the stream length information is embedded within the first and second set of SPMs.

6. A method of receiving broadcast information over a wireless broadcast network, comprising:
    receiving a plurality of flows, each flow carrying unique data;
    receiving a plurality of streams, each stream including at least a portion of the unique data carried by at least one of the plurality of flows;
    receiving a logical channel associated with the plurality of streams, the logical channel including an overhead portion, the overhead portion containing a first set of system parameter messages (SPMs), the first set of SPMs including a stream length information of each stream;
    receiving a frame, the frame including
        the logical channel,
        the plurality of streams, and
        a plurality of overhead information symbols (OIS), the OIS containing information identifying the location of the logical channel within the frame and a second set of SPMs identifying the stream lengths of each stream; and
    recovering the stream length information from one of the received first or second set of SPMs;
    locating streams within the frame by using the recovered stream length information; and
    reading the unique data from the located streams.

7. An apparatus for transmitting information over a wireless broadcast network, comprising:
    means for generating a plurality of flows, each flow carrying unique data;
    means for generating a plurality of streams, each stream including at least a portion of the unique data carried by at least one of the plurality of flows;
    means for determining stream length information for each stream;
    means for associating a logical channel with the plurality of streams, the logical channel including an overhead portion, the overhead portion containing a first set of system parameter messages (SPMs), the first set of SPMs including the stream length information of each stream;
    means for generating a frame, the frame including
        the logical channel,
        the plurality of streams, and
        a plurality of overhead information symbols (OIS), the OIS containing information identifying the location of the logical channel within the frame and a second set of SPMs identifying the stream lengths of each stream; and
    means for transmitting the frame such that the first set of SPMs are transmitted on a first transmission channel and the second set of SPMs are transmitted on a second transmission channel,
    wherein the second transmission channel has more robust transmission characteristics than the first transmission channel.

8. The apparatus of claim 7, further comprising means for associating the stream length information with overhead channel data.

9. The apparatus of claim 7, wherein the stream length information is based upon medium access control (MAC) layer packets.

10. The apparatus of claim 7, wherein the second set of SPMs are transmitted in accordance with first transmission characteristics and each stream is transmitted in accordance with second transmission characteristics.

11. The apparatus of claim 7, wherein the stream length information is embedded within the first and second set of SPMs.

12. A non-transitory processor-readable storage medium having stored thereon processor-executable instructions configured to cause one or more processors to perform operations comprising:

generating a plurality of flows, each flow carrying unique data;

generating a plurality of streams, each stream including at least a portion of the unique data carried by at least one of the plurality of flows;

determining stream length information for each stream;

associating a logical channel with the plurality of streams, the logical channel including an overhead portion, the overhead portion containing a first set of system parameter messages (SPMs), the first set of SPMs including the stream length information of each stream;

generating a frame, the frame including
  the logical channel,
  the plurality of streams, and
  a plurality of overhead information symbols (OIS), the OIS containing information identifying the location of the logical channel within the frame and a second set of SPMs identifying the stream lengths of each stream; and transmitting the frame such that the first set of SPMs are transmitted on a first transmission channel and the second set of SPMs are transmitted on a second transmission channel, wherein the second transmission channel has more robust transmission characteristics than the first transmission channel.

13. The non-transitory processor-readable storage medium of claim 12, further comprising associating the stream length information with overhead channel data.

14. The non-transitory processor-readable storage medium method of claim 12, wherein the stream length information is based upon medium access control (MAC) layer packets.

15. The non-transitory processor-readable storage medium of claim 12, wherein the second set of SPMs are transmitted in accordance with first transmission characteristics and each stream is transmitted in accordance with second transmission characteristics.

16. The non-transitory processor-readable storage medium of claim 12, wherein the stream length information is embedded within the first and second set of SPMs.

17. A transmission device for transmitting information over a wireless broadcast network, comprising:

a memory buffer; and a processor coupled to the memory buffer, wherein the processor is configured with software instructions to perform operations comprising:

generating a plurality of flows, each flow carrying unique data;

generating a plurality of streams, each stream including at least a portion of the unique data carried by at least one of the plurality of flows;

determining stream length information for each stream;

associating a logical channel with the plurality of streams, the logical channel including an overhead portion, the overhead portion containing a first set of system parameter messages (SPMs), the first set of SPMs including the stream length information of each stream;

generating a frame, the frame including
  the logical channel,
  the plurality of streams, and
  a plurality of overhead information symbols (OIS), the OIS containing information identifying the location of the logical channel within the frame and a second set of SPMs identifying the stream lengths of each stream; and transmitting the frame such that the first set of SPMs are transmitted on a first transmission channel and the second set of SPMs are transmitted on a second transmission channel, wherein the second transmission channel has more robust transmission characteristics than the first transmission channel.

* * * * *